United States Patent Office 2,898,244
Patented Aug. 4, 1959

2,898,244
VINYL CHLORIDE INTERPOLYMERS

Richard H. Martin, Jr., Springfield, Mass., assignor to Monsanto Chemical Company, St. Louis, Mo., a corporation of Delaware No Drawing. Application August 30, 1956
Serial No. 606,949

6 Claims. (Cl. 117—232)

The present invention relates to novel vinyl chloride interpolymers and to methods for preparing same.

Vinyl chloride homopolymers are widely employed as wire insulation because of their good physical and electrical insulating properties. A relatively recent development in the art has been the employment of polyvinyl chloride insulated wires as underground electrical cables. The insulation on such underground cables must be able to withstand severe physical punishment and for maximum utility requires vinyl chloride polymers having physical properties superior to those of many of the presently commercially available vinyl chloride homopolymers. In particular, this development requires vinyl chloride polymers having high tensile strength, high 100% modulus and high crush resistance.

It is known that the physical properties of vinyl chloride homopolymers such as tensile strength, 100% modulus and crush-resistance can be improved by preparing the polymer under such conditions that higher molecular weights are obtained. To obtain such higher molecular weights it is necessary to lower the polymerization temperature or to reduce the concentration of free radical generating polymerization initiator employed or both. Such modifications of the polymerization process increase the cost of preparing vinyl chloride homopolymers in that they lower the rate of polymerization and concomitantly the production capacity of the equipment in which the polymer is prepared.

It is an object of this invention to provide vinyl chloride polymers having improved physical properties.

Another object of this invention is to provide a process for preparing vinyl chloride polymers of improved physical properties, which process can be carried out in conventional polymerization equipment.

A further object of this invention is to provide a vinyl chloride polymerization process which, with no sacrifice in the rate of polymerization, yields vinyl chloride polymers of improved physical properties.

Other objects and advantages of this invention will be apparent from the following detailed description thereof.

It has been discovered that vinyl chloride polymers of improved physical properties, as compared with vinyl chloride homopolymers prepared under otherwise identical conditions, can be obtained by interpolymerizing minute but critical quantities of either diallyl fumarate or preferably diallyl maleate with vinyl chloride. Such improved vinyl chloride interpolymers contain 0.005–0.10 weight percent of diallyl fumarate or diallyl maleate, with the balance of the interpolymer being vinyl chloride. The vinyl chloride interpolymers of improved physical properties are obtained at rates of polymerization which are fully equivalent to those obtained in the homopolymerization of vinyl chloride.

As noted earlier herein, it is known that the physical properties of vinyl chloride polymers such as tensile strength, 100% modulus and crush-resistance are improved as the molecular weight of the vinyl chloride polymer is increased. This is true not only for vinyl chloride polymers per se, but also for formulated vinyl chloride polymer compositions containing plasticizers, pigments, fillers and other conventional polymer compounding ingredients. Since the precision of molecular weight determinations is much higher than the precision of determinations of tensile strength, 100% modulus and crush-resistance, the comparison of polymer properties in the subsequent examples is based primarily upon polymer molecular weights, such molecular weights being expressed in terms of the specific viscosities of the polymers. All of the specific viscosities reported herein are determined on 0.4 weight percent solutions of the polymer in cyclohexanone at 25±0.05° C. The precision of the reported values is ±0.002. The formula for calculating specific viscosities is set forth below:

$$\text{Specific viscosity} = \frac{\text{Solution viscosity} - \text{solvent viscosity}}{\text{Solvent viscosity}}$$

The following examples are set forth to illustrate more clearly the principle and practice of this invention to those skilled in the art. All parts are by weight.

EXAMPLE I

Part A

A vinyl chloride homopolymer is prepared in a stirred autoclave employing the suspension polymerization system set forth below:

| Component: | Parts by weight |
|---|---|
| Monomer | 100 |
| Water | 150 |
| Suspending agent [1] | 0.15 |
| Lauroyl peroxide | 0.25 |

[1] Equimolar interpolymer of vinyl acetate and maleic anhydride.

The polymerization is carried out at 49° C. and is completed in about 13 hours. The vinyl chloride homopolymer has a specific viscosity of 0.55.

Part B

An interpolymer consisting of 99.986 weight percent vinyl chloride and 0.014 weight percent diallyl maleate is prepared by the procedure of Part A above and has a specific viscosity of 0.62. In comparing this specific viscosity value with the specific viscosity of the vinyl chloride homopolymer prepared in Part A above, it will be noted that, although the interpolymer contains only 0.014 weight percent diallyl maleate, the specific viscosity of the resulting interpolymer is 13% higher than the value obtained with the vinyl chloride homopolymer.

Part C

The vinyl chloride-diallyl maleate interpolymer of Part B and the vinyl chloride homopolymer of Part A are both compounded into the wire coating formulation set forth below:

| Component: | Parts by weight |
|---|---|
| Resin | 100 |
| Di(2-ethylhexyl)phthalate | 42 |
| Secondary plasticizer [1] | 22 |
| Clay | 20 |
| Calcium carbonate | 15 |
| Stabilizer | 8 |
| Lubricant | 1 |

[1] Hydrocarbon type.

The tensile strength and 100% modulus of the two wire coating formulations are set forth in Table I.

TABLE I

| Polymer | Tensile Strength, p.s.i.[1] | 100% Modulus p.s.i.[1] |
| --- | --- | --- |
| Vinyl Chloride-Diallyl Maleate Interpolymer | 2,620 | 1,810 |
| Vinyl Chloride Homopolymer | 2,530 | 1,700 |

[1] Average of six samples.

It is seen from the above table that although the vinyl chloride-diallyl maleate interpolymer contains only 0.014 weight percent diallyl maleate it has a tensile strength 90 points higher and a 100% modulus 110 points higher than the vinyl chloride homopolymer prepared under identical polymerization conditions.

Part D

The vinyl chloride-diallyl maleate interpolymer of Part B and the vinyl chloride homopolymer of Part A are both compounded into the wire coating formulation set forth below:

| Component: | Parts by weight |
| --- | --- |
| Resin | 100 |
| Diisodecyl phthalate | 54 |
| Clay | 18 |
| Calcium carbonate | 15 |
| Basic lead carbonate | 5 |
| Stearic acid | 0.25 |
| Bisphenol A | 0.05 |

Both of the wire coating formulations are compression molded into 0.075 inch thick sheets and the shear strengths thereof are determined by a modification of ASTM Test D732–46. The punching tool is 1 inch long and the cross-sectional configuration thereof is an inverted truncated pyramid in which the width of the truncated base is 0.050 inch, the width of the base is 0.44 inch and the altitude is 0.47 inch. The test is performed on a Baldwin-Southwark machine and the punching tool is pressed into the plastic sheet at the rate of 0.5 inch per minute. The forces in pounds required to shear the samples are set forth in Table II.

TABLE II

| Polymer: | Shear strength, lbs.[1] |
| --- | --- |
| Vinyl chloride-diallyl maleate interpolymer | 1,110 |
| Vinyl chloride polymer | 1,080 |

[1] Average of ten samples.

It will be noted that the vinyl chloride-diallyl maleate interpolymer has a resistance to shear 30 points higher than that of the vinyl chloride homopolymer prepared under identical polymerization conditions. These results are significant in that experience has shown that the above described test correlates well with the force required to crack the insulation on a vinyl chloride polymer coated wire.

EXAMPLE II

Example I, Part B, is repeated except that the diallyl maleate contained in the polymerization system is replaced with diallyl fumarate. The physical properties of the resulting interpolymer correspond to those of the interpolymer obtained in Example I, Part B.

EXAMPLES III–VII

Five vinyl chloride-diallyl maleate interpolymers containing varying quantities of diallyl maleate are prepared under identical polymerization conditions following the procedure of Example I, Part A, except that the polymerization temperature is increased to 52° C. The composition of the interpolymers and the specific viscosities thereof are set forth in Table III.

TABLE III

| Polymer | Wt. Percent Diallyl Maleate in Interpolymer | Specific Viscosity |
| --- | --- | --- |
| Control—Vinyl Chloride Homopolymer | 0 | 0.49 |
| Example III | 0.005 | 0.50 |
| Example IV | 0.010 | 0.53 |
| Example V | 0.020 | 0.57 |
| Example VI | 0.030 | 0.64 |
| Example VII | 0.040 | 0.71 |

As seen in the above table, each of the interpolymers containing diallyl maleate has a higher specific viscosity than the vinyl chloride homopolymer prepared under the identical polymerization conditions. Each of the diallyl maleate containing interpolymers has a higher tensile strength and 100% modulus than the control vinyl chloride homopolymer.

The interpolymers of this invention are binary interpolymers consisting of 99.90–99.995 weight percent vinyl chloride and, correspondingly, 0.10–0.005 weight percent of diallyl maleate or diallyl fumarate. Interpolymers containing less than 0.005 weight percent diallyl maleate or diallyl fumarate cannot be distinguished from vinyl chloride homopolymers and interpolymers containing more than about 0.1 weight percent of diallyl maleate or diallyl fumarate are difficult to process in conventional plastic working equipment such as extruders, etc. In a preferred embodiment of the invention the interpolymers contain 0.01–0.05 weight percent and more especially 0.013–0.030 weight percent of the diallyl maleate or diallyl fumarate with the balance of the interpolymer being vinyl chloride. For diverse reasons including cost and ease of polymerization the vinyl chloride-diallyl maleate interpolymers are a preferred species of the invention.

The interpolymers of the invention are preferably prepared by the well-known suspension polymerization process in which the monomers are dispersed as small droplets in water and polymerized therein. Although a water-soluble interpolymer of vinyl acetate and maleic anhydride has been employed as the suspending agent in the examples herein presented, other known suspending agents such as gelatine, protective colloids, etc. may be employed if desired. The polymerizations are carried out at temperatures in the range of 30–70° C. in the presence of free radical generating catalysts such as lauroyl peroxide, benzoyl peroxide, etc.

The interpolymers of this invention have higher molecular weights and better physical properties than corresponding vinyl chloride homopolymers prepared under identical polymerization conditions. Thus, the process of this invention makes possible the attainment of a superior product at no increase in cost. Alternatively, interpolymers of this invention having equivalent physical properties to vinyl chloride homopolymers can be prepared at higher polymerization temperatures. Polymerizing the interpolymers at higher temperatures increases the rate of polymerization and raises the productive capacity of the polymerization vessel in which the reaction is carried out. Thus, the interpolymers of this invention make possible the attainment of a higher productive capacity per unit of capital investment. In general, the productive capacity of a polymerization vessel for the interpolymers of this invention is approximately 30% higher than the production capacity of the same vessel for a vinyl chloride homopolymer, both of said polymers being polymerized under conditions which give identical molecular weights.

The interpolymers of this invention may be used interchangeably with vinyl chloride homopolymers in virtually all industrial applications. The interpolymers are particularly suitable for use in the insulation of electric wire and particularly for electric wire that is to be employed as underground cable.

The above descriptions and particularly the examples are set forth by way of illustration only. Many other variations and modifications thereof will be obvious to those skilled in the art and can be made without departing from the spirit and scope of the invention herein disclosed.

What is claimed is:

1. A resinous interpolymer of the monomers consisting of 99.90–99.995 weight percent vinyl chloride and, correspondingly, 0.10–0.005 weight percent of a monomer of the group consisting of diallyl maleate and diallyl fumarate.

2. A resinous interpolymer of the monomers consisting of 99.95–99.99 weight percent vinyl chloride and, correspondingly, 0.05–0.01 weight percent diallyl maleate.

3. A resinous interpolymer of the monomers consisting of 99.97–99.987 weight percent vinyl chloride and, correspondingly, 0.03–0.013 weight percent diallyl maleate.

4. In the method for preparing vinyl chloride polymers by the suspension polymerization process, the improvement which comprises polymerizing a monomer mixture consisting solely of 99.90–99.995 weight percent vinyl chloride and, correspondingly, 0.10–0.005 weight percent of a monomer of the group consisting of diallyl maleate and diallyl fumarate.

5. The process of claim 4 in which the monomer mixture polymerized consists of vinyl chloride and diallyl maleate.

6. An insulated electric wire comprising an electrical conductor carrying an insulating coating of a resinous interpolymer consisting of 99.90–99.995 weight percent of the monomers vinyl chloride and, correspondingly, 0.10–0.005 weight percent of a monomer of the group consisting of diallyl maleate and diallyl fumarate.

References Cited in the file of this patent

UNITED STATES PATENTS

| | | |
|---|---|---|
| 2,047,398 | Voss et al. | July 14, 1936 |
| 2,256,160 | Britton et al. | Sept. 16, 1941 |
| 2,470,909 | Baer | May 24, 1949 |
| 2,485,270 | Folt | Oct. 18, 1949 |
| 2,496,384 | De Nie | Feb. 7, 1950 |

FOREIGN PATENTS

| | | |
|---|---|---|
| 492,279 | Canada | Apr. 21, 1953 |

OTHER REFERENCES

Wente: Abstract of application Serial No. 781,418, 656 O.G. 890, March 18, 1952.

UNITED STATES PATENT OFFICE
CERTIFICATE OF CORRECTION

Patent No. 2,898,244  August 4, 1959

Richard H. Martin, Jr.

It is hereby certified that error appears in the printed specification of the above numbered patent requiring correction and that the said Letters Patent should read as corrected below.

Column 6, line 6, after "interpolymer" insert -- of the monomers --; same column, lines 6 and 7, strike out "of the monomers".

Signed and sealed this 12th day of January 1960.

(SEAL)
Attest:

KARL H. AXLINE
Attesting Officer

ROBERT C. WATSON
Commissioner of Patents